United States Patent [19]

Aoyagi

[11] Patent Number: 4,481,849
[45] Date of Patent: Nov. 13, 1984

[54] HORIZONTAL BANDSAW MACHINE

[75] Inventor: Minoru Aoyagi, Hatano, Japan

[73] Assignee: Amada Company, Limited, Isehara, Japan

[21] Appl. No.: 306,505

[22] Filed: Sep. 28, 1981

[30] Foreign Application Priority Data

Sep. 29, 1980 [JP] Japan .................... 55-134238
May 12, 1981 [JP] Japan .................... 56-70152

[51] Int. Cl.$^3$ .................................... B27B 13/04
[52] U.S. Cl. ........................... 83/796; 83/63; 83/360; 83/525; 83/813
[58] Field of Search ........... 83/796, 797, 798, 799, 83/800, 813, 809, 360, 63, 812, 368, 525, 527

[56] References Cited

U.S. PATENT DOCUMENTS

| | | | |
|---|---|---|---|
| 1,453,609 | 5/1923 | Stowell | 83/796 |
| 2,602,987 | 7/1952 | Wells | 83/800 |
| 2,630,622 | 3/1953 | Beck | 83/796 |
| 3,721,139 | 3/1973 | Robinson et al. | |
| 3,875,839 | 4/1975 | Aizawa | |
| 4,170,912 | 10/1979 | Bliss | 83/798 |
| 4,296,661 | 10/1981 | Kaneko | 83/796 |

FOREIGN PATENT DOCUMENTS 15-33988 11/1940 Japan.

Primary Examiner—Donald R. Schran
Assistant Examiner—Thomas M. Kline
Attorney, Agent, or Firm—Armstrong, Nikaido, Marmelstein & Kubovcik

[57] ABSTRACT

An apparatus is provided for controlling the raising and lowering of a cutting head assembly of a horizontal bandsaw machine. The apparatus comprises a sensing member for sensing the top surface of a workpiece to be cut and an actuating device which is operatively coupled to the sensing member. The actuating device switches from a first state to a second state when the sensing member senses the top surface of the workpiece. A carrier device is operatively coupled to the actuator wherein the position of the carrier is movable with respect to the cutting edge of the blade of the bandsaw when the actuator is in the first state and the position of the carrier is fixed with respect to the cutting edge of the bandsaw when the actuator is in the second state. A detector is mounted on the cutting head assembly for movement therewith such that the detecting member contacts the carrier device upon the raising of the cutting head wherein upon contact of the detector and the carrier device, the detector provides a signal for stopping the further raising of the cutting head.

5 Claims, 7 Drawing Figures

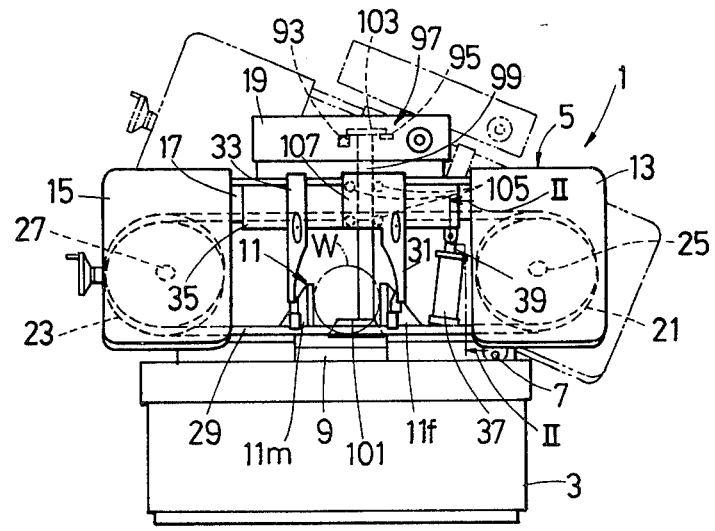
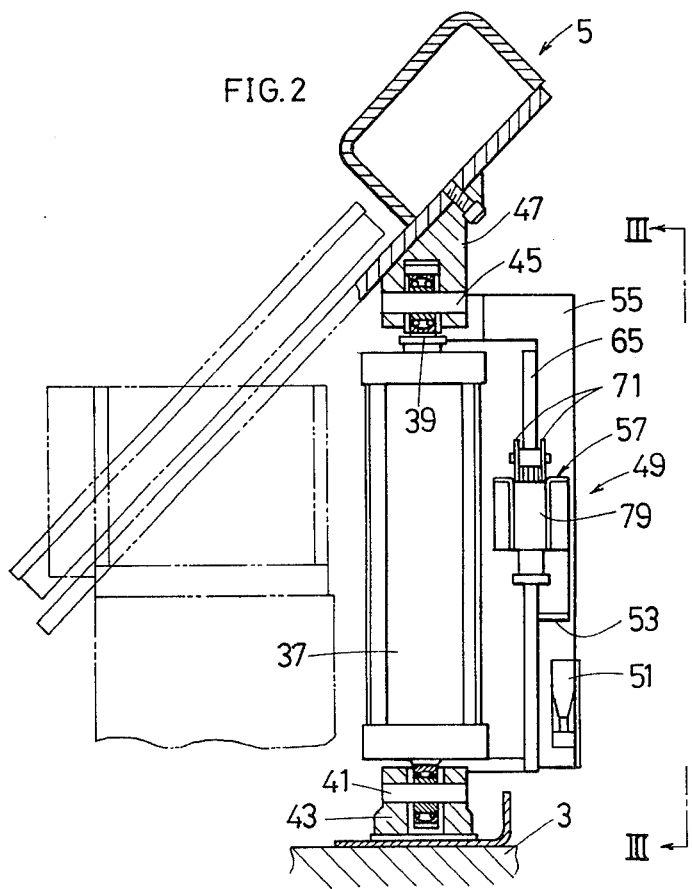

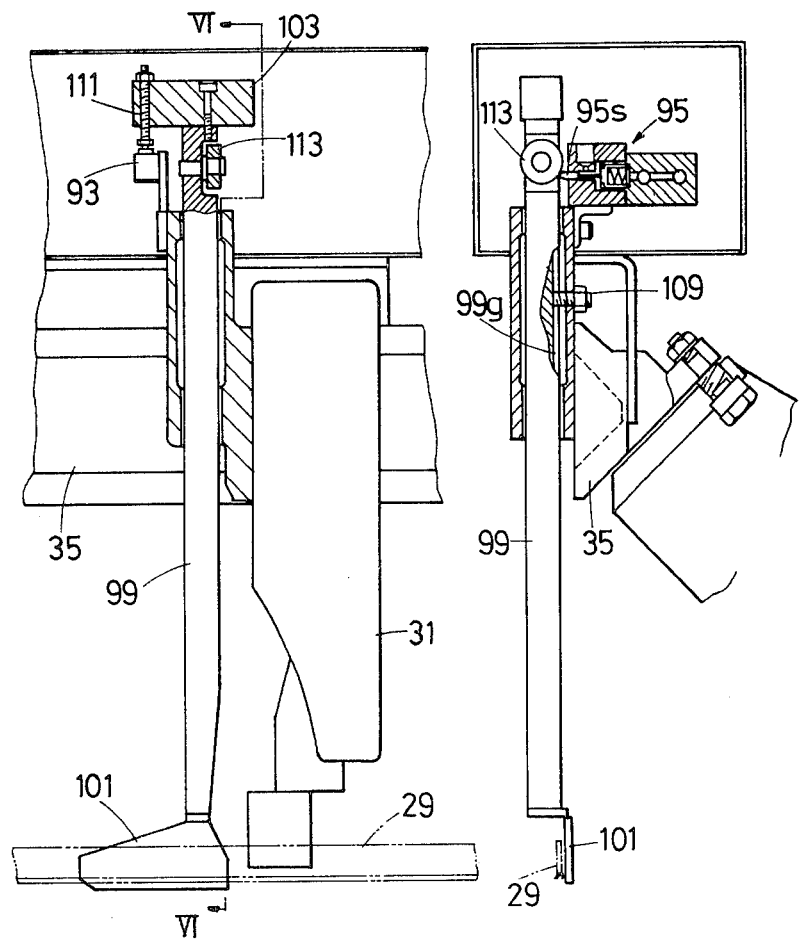

HORIZONTAL BANDSAW MACHINE

BACKGROUND OF THE INVENTION

1. Field of the Invention

The present invention relates generally to horizontal bandsaw machines having a flexible endless bandsaw blade trained around a plurality of wheels or pulleys to perform cutting operations and, more particularly, pertains to control means for controlling the bandsaw blade according to sizes and shapes of workpieces to be cut in the horizontal bandsaw machines.

2. Description of the Prior Art

As is well known, horizontal bandsaw machines comprise a base on which a workpiece or workpieces to be cut are to be placed and clamped and a cutting head assembly in which a flexible endless bandsaw blade is trained around a pair of wheels or pulleys, one of which is power driven to drive the bandsaw blade. In the cutting head assembly, the bandsaw blade is slidably held and guided with its cutting edge faced perpendicularly downwardly by a pair of guide means at the cutting zone where cutting is performed so that it may cut into the workpiece to be cut. The cutting head assembly is so arranged as to be raised away from and lowered toward the base by a suitable means such as a hydraulic motor around a hinge pin or along one or more vertically disposed guide means. Thus, in each cutting cycle, the cutting head assembly is firstly raised and then lowered towards the base so as to enable the bandsaw blade being driven therein around the wheels to cut the workpiece which has been placed and clamped on the base. Also, in automatic horizontal bandsaw machines there are provided arrangements for automatically raising and lowering the cutting head assembly and automatically feeding workpieces to be cut into the cutting zone after completion of each cutting cycle.

In the horizontal bandsaw machine of the above described arrangement, it is desired to minimize the up-and-down movement of the cutting head assembly in order to minimize the idling of the bandsaw blade. In other words, it is desired to make the upper or returning limit of the bandsaw blade as small as possible depending upon the height or diameter of the workpiece to be cut. On the other hand, however, it is necessary to make the returning limit of the bandsaw blade a little higher than the top surface of the workpiece to be cut so as to prevent the bandsaw blade from being damaged by the workpiece being fed, since the workpiece is not exactly straight but more or less uneven. Accordingly, in order to minimize the idling of the bandsaw blade, it is further desired to lower the cutting head assembly carrying the bandsaw blade at a faster rate before the bandsaw blade cuts into the workpiece.

SUMMARY OF THE INVENTION

It is an object of the present invention to provide a horizontal bandsaw machine in which the upper or returning limit of the bandsaw blade can be readily determined according to the height or size of the workpiece to be cut so as to minimize the idling of the bandsaw blade.

It is another object of the present invention to provide a horizontal bandsaw machine in which the bandsaw blade can be automatically lowered at a fast rate during its idle time when it is only lowering from its upper or returning limit towards the workpiece to be cut without making any cutting action so as to further minimize the idling of the bandsaw blade.

It is therefore an object of the present invention to provide a horizontal bandsaw machine in which the bandsaw blade is automatically stopped from rising at its desired upper limit and thereafter is lowered initially at a faster rate and then is slowed down when cutting into the workpiece to make an accurate cutting action.

Other and further objects of the present invention will be apparent from the following description and accompanying drawings which, by way of illustration, show a preferred embodiment of the present invention and the principle thereof.

BRIEF DESCRIPTION OF THE DRAWINGS

FIG. 1 is a front elevational view of a horizontal bandsaw machine embodying the principles of the present invention.

FIG. 2 is a sectional view taken along the line II—II of FIG. 1.

FIG. 5 is a front partial view showing a front portion of the horizontal bandsaw machine shown in FIG. 1.

FIG. 6 is a sectional view taken along the line VI—VI of FIG. 5.

DESCRIPTION OF THE PREFERRED EMBODIMENT

Figure 3:
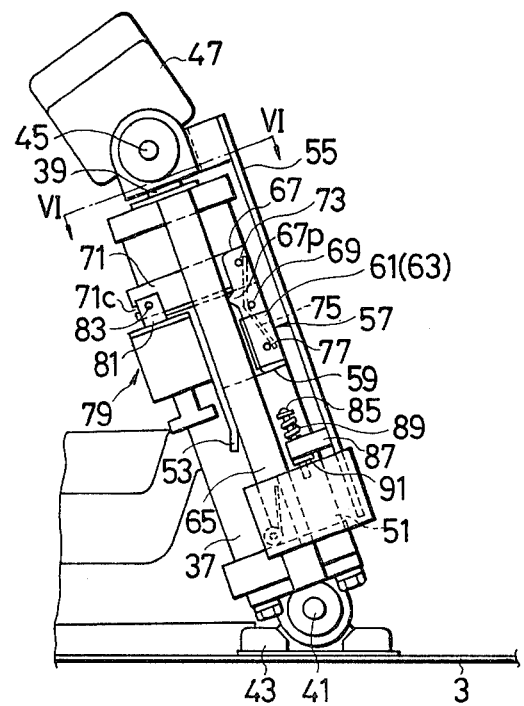
FIG. 3 is a view taken along the line III—III of FIG. 2.
Figure 4:
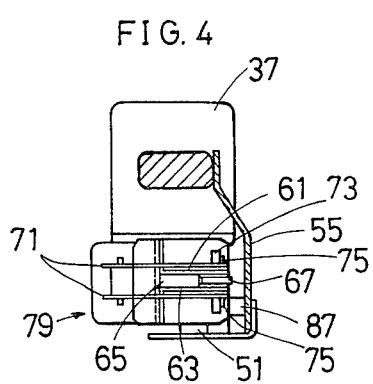
FIG. 4 is a sectional view taken along the line IV—IV of FIG. 3.

Referring to FIG. 1, the horizontal bandsaw machine 1 comprises a box-like base 3 and a cutting head assembly 5 which is pivotally connected to the base 3 by means of a hinge pin 7 to be movable up and down toward and away from the same. The base 3 is provided at its top with a work-table 9 on which a workpiece W to be cut can be placed, and the work-table 9 is provided with a vise assembly 11 which has a fixed jaw 11$f$ and a movable jaw 11$m$ to clamp the workpiece W therebetween. The cutting head assembly 5 has spaced housing sections 13 and 15 connected with each other by a beam member 17 and is provided at its top with a control box 19. In the cutting head assembly 5, a driving wheel 21 and a driven wheel 23 having shafts 25 and 27, are enclosed in the housing sections 13 and 15, respectively, and a flexible endless bandsaw blade 29 is trained therearound so that it may be driven to make a cutting action when the driving wheel 21 is power driven. The bandsaw blade 29 is slidably held or guided with its cutting edge faced perpendicularly downwardly by a fixed guide assembly 31 and a movable guide assembly 33 so that a cutting stretch may be provided therebetween at the cutting zone of the horizontal bandsaw machine 1. The fixed and movable guide assemblies 31 and 33 are mounted on a guide way 35 which is fixed to the beam member 17 in a manner such that they depend therefrom in parallel with each other. The fixed guide assembly 31 is fixedly mounted on the guide way 35, while the movable guide assembly 33 is so mounted that it may be fixed on the guide way 35 in operation but may be moved toward and away from the fixed guide assembly 31 to adjust the cutting stretch of the bandsaw blade 29 according to the size of the workpiece W to be cut. Also, the cutting head assembly 5 of the above described construction is so arranged as to be swung up and down around the hinge pin 7 by a hydraulic motor 37 of a cylinder type having a piston rod 39 to feed and return the bandsaw blade 29 into and away from the workpiece W to be cut. As is shown in FIGS. 2 and 3, the hydraulic motor 37 is pivotally connected to the base 3 by means of a hinge pin 41 and a clevis member 43, and the piston rod 39 of the hydraulic motor 37 is also pivotally connected to the cutting head assembly 5 by means of a hinge pin 45 and a clevis member 47 in the preferred embodiment. Thus, when the cutting head assembly 5 is swung down around the hinge pin 7 from its raised position, the bandsaw blade 29 rotating around the driving wheel 21 and the driven wheel 23 in the cutting head assembly 5 will be fed to cut the workpiece W clamped by the vise assembly 11 on the work-table 9. As is well-known, the cutting head assembly 5 can be automatically raised and lowered for each cutting cycle, and the workpiece W to be cut can be automatically fed into and clamped by the vise assembly 11 after completion of each cutting action.

Referring particularly to FIGS. 2 and 3, the horizontal bandsaw machine 1 is provided with a stroke controlling device 49 for controlling the return stroke or upper travelling limit of the bandsaw blade 29. The stroke controlling device 49 comprises a detecting means 51 such as a limit switch which is carried by the cutting head assembly 5 and a dog member 53 which is movably disposed but can be fixed to actuate the detecting means 51. For the purpose of controlling the return stroke of the bandsaw blade 29, the detecting means 51 is so arranged as to be actuated when brought into contact with the dog member 53 and when actuated to stop the hydraulic motor 37 from raising the cutting head assembly 5.

As best shown in FIG. 3, the detecting means 51 is fixedly mounted on the lower end of an elongate carrying member 55 which is fixed to a portion of the cutting head assembly 5 in such a manner as to depend therefrom at a close space from the hydraulic motor 37 and in parallel with the piston rod 39 of the hydraulic motor 37. Also, the dog member 53 is carried by a carrier member 57 which has a flat projection 59 and a pair of walls 61 and 63 in the preferred embodiment for the purposes to be seen hereinafter and is slidably mounted on an elongate guide rod member 65 which is held by the hydraulic motor 37. In the preferred embodiment, the carrier member 57 is of a frame slidably surrounding the guide rod member 65 and is so formed that the flat projection 59 projects outwardly substantially at right angles with the guide rod member 65 and the walls 61 and 63 extend upwardly from the opposite ends of the flat projection 59 in parallel with each other to form a channel-like cavity. On the other hand, the guide rod member 65 is slidably surrounded by the carrier member 57 which is square in cross section, and it is fixed at its end or ends to the hydraulic motor 37 at a space therefrom and in parallel with the piston rod 39 of the hydraulic motor 37 so that the carrier member 57 may slide up and down therealong. Also, the detecting means 51 is so disposed that it may be brought into contact with the dog member 53 which has been fixed on the guide rod member 65 together with the carrier member 57 when raised up by the carrying member 6R and the cutting head assembly 5. Thus, the cutting head assembly 5 will be stopped from rising together with the bandsaw blade 29 as soon as the detecting means 51 is brought by the cutting head assembly 5 and the carrying member 55 into contact with the dog member 53 which has been fixed on the guide rod member 65. When the cutting head assembly 5 is raised, a roller at the free end of a lever extending from the limit switch 51 which is fixed to the cutting head assembly 5 comes into contact with the dog member 53 fixed on the guide rod member 65. So that the electricity for the motor of the hydraulic cylinder 37 is cut off restricting the rising of the cutting head assembly 5. From the above description, it will be understood that the return stroke or upper travelling limit of the bandsaw blade 29 can be controlled by moving and fixing the dog member 53 on the guide rod member 65.

In order to fix the carrier member 57 together with the dog member 53 on the guide rod 65, a swinging clamping member 67 having a clamping projection 67p is pivotally disposed between the walls 61 and 63 of the carrier member 57 by a hinge pin 69 which is spanned or bridged between the upper ends of the walls 61 and 63. The swinging clamping member 67 is so arranged that the clamping projection 67p will be normally kept in contact with the guide rod member 65 and clamp the same with the carrier member 57 when it is urged around the hinge pin 69 to the guide rod member 65. Also, the swinging clamping member 67 has a lever member 71 which is integrally fixed thereto substantially at right angles by a suitable means such as a pin 73 and is formed at its end with a slot-like concavity 71c. As seen from FIG. 3, the lever member 71 may consists of two elongate members which are connected with each other at their ends by a connecting member and are so disposed as to integrally sandwich the swinging clamping member 67 therebetween and extend in parallel with each other in such a manner as to surround the guide rod member 65 in the preferred embodiment. Also, the swinging clamping member 67 is kept biased by a spring or springs 75 to the guide rod member 65 to keep the clamping projection 67p in contact with the guide rod member 65 so that the carrier member 57 may be normally fixed on the guide rod member 65 together with the dog member 53. In the preferred embodiment, two leaf springs 75 are connected at their ends to a pin 77 which is spanned between the walls 61 and 63 of the carrier member 57 and are resiliently extended to the pin 73 with their midway portions disposed in contact with the hinge pin 69 as their supporting points so as to bias the clamping projection 67p of the swinging clamping member 67 to the guide rod member 65. More particularly, all the ends of the pin 77, the pin 73 and the hinge pin 69 are set to project outwardly from the walls 61 and 63, and the leaf springs 75 are disposed outside the walls 61 and 63 in parallel with each other and extend from the projecting ends of the pin 77 to the projecting ends of the pin 73 in contact with the projecting ends of the hinge pin 73 as supporting points.

In order to enable the carrier member 57 to move on the guide rod member 65 to move the dog member 53, there is provided an actuating means 79 such as a solenoid operated actuator which is provided with an actuating member 81 having a pin 83. The actuating means 79 is so arranged as to project the actuating member 81 when energized, and it is fixedly mounted on the carrier member 57 with the pin 83 slidably inserted in the slot-like concavity 71c of the lever member 71. More particularly, the actuating means 79 is disposed on the carrier member 57 in a manner such that the actuating member 81 can push the lever member 71 by means of the pin 83 to rotate the swinging clamping member 67 around the hinge pin 69 against the leaf springs 75. Thus, when the actuating means 79 is energized to enable the actuating member 81 to push the lever member 71, the swinging clamping member 67 will be rotated around the hinge pin 69 to bring the clamping projection 67p out of contact with the guide rod member 65 so that the carrier member 57 may move along the guide rod member 65 together with the dog member 53. In this connection, however, the actuating means 79 is so arranged as to be energized to enable the carrier member 57 to move only before the bandsaw blade 29 cuts into the workpiece W at the first cutting cycle when the workpiece W is to be automatically cut, as will be understood hereinafter. Also, of course it will be readily understood that the carrier member 57 can freely move along the guide rod member 65 together with the dog member 53 when the actuating means 79 is energized to project the actuating member 81. In the above described arrangement, in order to set the return stroke or upper travelling limit of the bandsaw blade 29, the carrier member 57 is firstly moved along the guide rod member 65 with the actuating means 79 energized and then is fixed thereon by de-energizing the actuating means 79.

The carrier member 57 is so arranged as to be moved along the guide rod member 65 by the cutting head assembly 5 when the actuating means 79 is energized to keep the clamping projection 67p of the swinging clamping member 67 out of contact with the guide rod member 65. For this purpose, a holding member 85 is provided on the elongate carrying member 55 held by the cutting head assembly 5 so that it may be brought into contact with the bottom of the flat projection 59 of the carrier member 57 when the carrying member 55 is moved together with the cutting head assembly 5. In the preferred embodiment, the holding member 85 is held by the carrying member 55 by means of a bracket 87 fixed thereto, and it is of a slidable elongate member which is upwardly biased by a spring 89 and is held stopped by an adjustable stop member 91 such as a nut from being springed out. More particularly, the holding member 85 is slidably inserted in a bore formed in the bracket 87 in parallel with the elongate carrying member 55 and is upwardly biased by the spring 89 to resiliently hold the carrier member 57. Thus, the carrier member 57 is raised along the guide rod member 65 by the cutting head assembly 5 through the holding member 85 and the carrying member 55, and it will lower by its own gravity as the holding member 85 is lowered together with the carrying member 55 by the cutting head assembly 5. Of course, when the carrier member 57 is to be moved along the guide rod member 65 upwardly or downwardly, the actuating means 79 is kept energized to keep the clamping projection 67p of the swinging clamping member 67 out of contact with the guide rod member 65.

Referring again to FIG. 1, the actuating means 79 of the stroke controlling means 49 can be energized and de-energized by a detecting means 93 such as a limit switch which is provided in the control box 19 mounted on the top of the cutting head assembly 5. The detecting means 93 is so arranged as to energize the actuating means 79 into action when the switch contact of the limit switch is pushed under pressure and contrarily de-energize the actuating means 79 out of action when the switch contact is released or not pushed. As has been briefly described hereinbefore, however, the detecting means 93 is so arranged as not to energize the actuating means 79, even when pushed, after the bandsaw blade 29 has cut into the workpiece W in the first cutting cycle when the workpiece W is to be automatically continuously cut. Also, the detecting means 93 is so disposed as to be pushed and released together with a valve means 95 such as a check valve which is also provided in the control box 19 to control the lowering of the cutting head assembly 5 in a manner which will be described in great detail hereinafter. Briefly, the valve means 95 is so arranged in a known manner as to enable the cutting head assembly 5 to lower toward the workpiece W to be cut at a higher speed when pushed and slow down the cutting head assembly 5 to enable the bandsaw blade 29 to make an accurate and economical cutting action when it is not pushed under pressure. In the preferred embodiment, also, the detecting means 93 and the valve means 95 are mounted in the control box 19 side by side substantially on a level with each other with a space provided thereabove so that they may be concurrently pushed and released as will be seen hereinafter.

As shown in FIG. 1, in order to control or push and release the actuating means 93 and the valve means 95, a sensing and controlling means 97 is mounted on the cutting head assembly 5 so that it may be freely moved up and down between the fixed and movable guide assemblies 31 and 33 and in and through the control box 19. The sensing and controlling means 97 comprises an elongate bar member 99, a sensing member 101 and a controlling member 103 and it is mounted on the cutting head assembly 5 with the elongate bar member 99 slidably disposed between the fixed and movable guide assemblies 31 and 33 in parallel therewith. The elongate bar member 99 is of a length extending substantially from the control box 19 to the bandsaw blade 29, and the sensing member 101 and the controlling member 103 are fixed to the lower end and the upper end, respectively, of the elongate bar member 99. In the preferred embodiment, the sensing member 101 and the controlling member 103 are each of a longish member, and the former is fixed to the lower end of the elongate bar member 99 at right angles in a L-shaped form, while the latter is fixed to the upper end thereof at right angles in a form of an inverted T-shape.

The sensing and controlling means 97 of the above described construction is so arranged as to be moved with regard to the cutting head assembly 5 in such a manner as to enable the controlling member 103 to move onto and away from the detecting means 93 and the valve means 95 and also rides thereon. Of course, the sensing member 101 of the sensing and controlling means 97 will be simultaneously moved toward and away from the workpiece W to be cut when the controlling member 103 is moved into and out of contact with the detecting means 93 and the valve means 95. Also, as seen from FIGS. 5 and 6, the sensing and controlling means 97 is so arranged that the sensing member 101 will depend slightly lower than the cutting edge of the bandsaw blade 29 when the controlling member 103 is in contact with or rides on the detecting means 93 and the valve means 95. In this arrangement, the elongate bar member 99 of the controlling and sensing means 97 is so arranged as to be freely slided up and down on the cutting head assembly 5 in parallel with the fixed and moved guide assemblies 31 and 33 and along or in parallel with the vertical plane of the bandsaw blade 29 between the guide assemblies 31 and 33. As shown in FIG. 1, the elongate bar member 99 is movably held and guided by a plurality of rollers 105 which are freely rotatably provided on a plate 107 integrally fixed to or formed on the fixed guide assembly 31 in the preferred embodiment. Furthermore, as shown in FIG. 6, the elongate bar member 99 is formed with an elongate groove 99g and is so arranged as to be prevented from rotating by a bolt 109 engaging the groove 99g in the preferred embodiment.

In the above described arrangement, the sensing and controlling means 97 will be held on the detecting means 93 and the valve means 95 by means of the controlling member 103 when the sensing member 101 is free to keep projecting downwardly lower than the cutting edge of the bandsaw blade 29. As will be readily understood, the sensing member 101 is free to keep projecting downwardly lower than the bandsaw blade 29 when it has been raised together with the cutting head assembly 5 out of contact with the workpiece W to be cut. Thus, when the cutting head assembly 5 has been raised to keep the sensing member 101 out of contact with the workpiece W to be cut, the controlling member 103 will be urged to the detecting means 93 and the valve means 95 by the effect of gravity on the sensing and controlling means 97. On the other hand, the controlling member 103 will be brought out of contact with the detecting means 93 and the valve means 95 as soon as the sensing member 101 is brought into contact with the workpiece W to be cut when the cutting head assembly 5 is lowered. Also, the sensing member 101 will be brought into contact with the workpiece W to be cut ahead of the bandsaw blade 29 and remain thereafter on the workpiece W together with the whole sensing and controlling means 97 without being further lowered when and as the cutting head assembly 5 is lowered. Of course, the bandsaw blade 29 will go on lowering together with the cutting head assembly 5 to cut into the workpiece W while the sensing 101 member remains on the workpiece W after having been brought into contact therewith. Also, when the cutting head assembly 5 is raised after a completion of a cutting action, the detecting means 93 and the valve means 95 will be initially brought into contact with the controlling member 103 and then will raise the whole sensing and controlling means 97. However, the detecting means 93 will not energize the actuating means 79 to make the carrier member 57 movable along the guide rod member 65 when the workpiece W is being automatically continuously cut, and the valve means 95 will not change states although the detecting means is brought into contact with the controlling member 103. As has been described hereinbefore, the detecting means 93 has been so arranged as not to energize the actuating means 79 after the bandsaw blade 29 has cut into the workpiece W in the first cutting cycle when the workpiece W is to be automatically continuously cut. Also, of course, the valve means 95 could not work to lower the cutting head assembly 5 at a higher speed, when the hydraulic motor 37 is being supplied with the hydraulic fluid to raise the cutting head assembly 5.

As will be now understood from the above description, the detecting means 93 will be moved and the valve means 95 will be pushed by the effect of gravity on the sensing and controlling means 97 when the sensing member 101 is kept out of contact with the workpiece W to be cut. Accordingly, when the cutting head assembly 5 has been raised to keep the sensing member 101 out of contact with the workpiece W to be cut, the detecting means 93 will keep the actuating means 79 energized to keep the swinging clamping member 67 away from the guide rod member 65 so that the carrier member 57 may freely move therealong together with the dog member 53. As has been described hereinbefore, the carrier member 57 is lowered by its gravity with the flat projection 59 held by the carrying member 55 to lower the dog member 53 as the cutting head assembly 5 is lowered, and the detecting means 51 is also simultaneously lowered by the cutting head assembly 5 together with the elongate carrying member 55. Also, the valve means 95 will allow the cutting head assembly 5 to be lowered at a higher speed toward the workpiece W to be cut to minimize the idle time, when the cutting head assembly 5 has been raised to keep the sensing member 101 out of contact with the workpiece W. Thus, until the sensing member 101 is lowered to be brought into contact with the workpiece W to be cut, the cutting head assembly 5 will be lowered at a higher speed toward the workpiece W and the carrier member 57 will be freely lowered together with the dog member 53 along the guide rod member 65, as the cutting head assembly 5 is lowered.

However, as soon as the sensing member 101 is brought into contact with the workpiece W to be cut, the controlling member 103 will stop lowering, and therefore the detecting means 93 and the valve means 95 will be brought out of contact with the controlling member 103 by the cutting head assembly 5 which will further go on lowering. Accordingly, as soon as the sensing member 101 is brought into contact with the workpiece W to be cut, the detecting means 93 will de-energize the actuating means 79 to enable the swinging clamping member 67 to stop and fix the carrier member 57 on the guide rod member 65 so as to position the dog member 53 thereon. However, of course it will be understood that the detecting member 51 will go on being further lowered by the cutting head assembly 5 even after the carrier member 57 has been fixed on the guide rod member 65 to position the dog member 53 so long as the cutting head assembly 5 continues to be lowered. Also, the valve means 95 will slow down the cutting head assembly 5 to enable the bandsaw blade 29 to cut accurately the workpiece W at a moderate speed without being overworked, as soon as the sensing member 101 is brought into contact with the workpiece W. In this connection, it will be understood that the bandsaw blade 29 will cut into the workpiece W at a moderate speed after the cutting head assembly 5 has been slowed down, since the sensing member 101 will be brought into contact with the workpiece W ahead of the bandsaw blade 29.

In the meantime, the cutting head assembly 5, on reaching its lowermost travelling limit to complete a cutting action, is automatically turned to be raised in a well-known manner to raise the bandsaw blade 29 together with the detecting means 93 and the valve means 95 as well as the detecting means 51. Then, the detecting means 93 and the valve means 95 will be raised up by the cutting head assembly 5 into contact with the controlling member 103 of the sensing and controlling means 97 and will raise the whole sensing and controlling means 97. However, when the workpiece W is to be automatically continuously cut, the detecting means 93 will not energize the actuating means 79 even when brought into contact with the controlling member 103 as has been described hereinbefore, and therefore the carrier member 57 will remain fixed on the guide rod member 65 with the dog member 53 held positioned. Also, of course the valve means 95 could not and need not work to lower the cutting head assembly 5 at a higher speed in this case where the hydraulic motor 37 is being supplied with the hydraulic fluid to raise the cutting head assembly 5, although it is depressed by the controlling member 103.

Referring to FIGS. 5 and 6, the detecting means 93 and the valve means 95 are so arranged as to be pushed by the controlling member 103 by means of an adjustable dog member 111 and a roller member 113, respectively, in the preferred embodiment. The adjustable dog member 111 is adjustably fixed to the controlling member 103 so that the detecting means 93 is brought into contact therewith when it is brought up by the cutting head assembly 5. Also, the roller member 113 is rotatably provided beneath the controlling member 103 so as to rotatingly push the valve means 95 when the cutting head assembly 5 is raised to bring up the valve means 95 together with the detecting means 93. In this connection, the valve means 95 is provided with a projecting retractable spool member 95s which is so arranged as to be pushed by the roller member 113 in the preferred embodiment as shown in FIG. 6.

Figure 7:
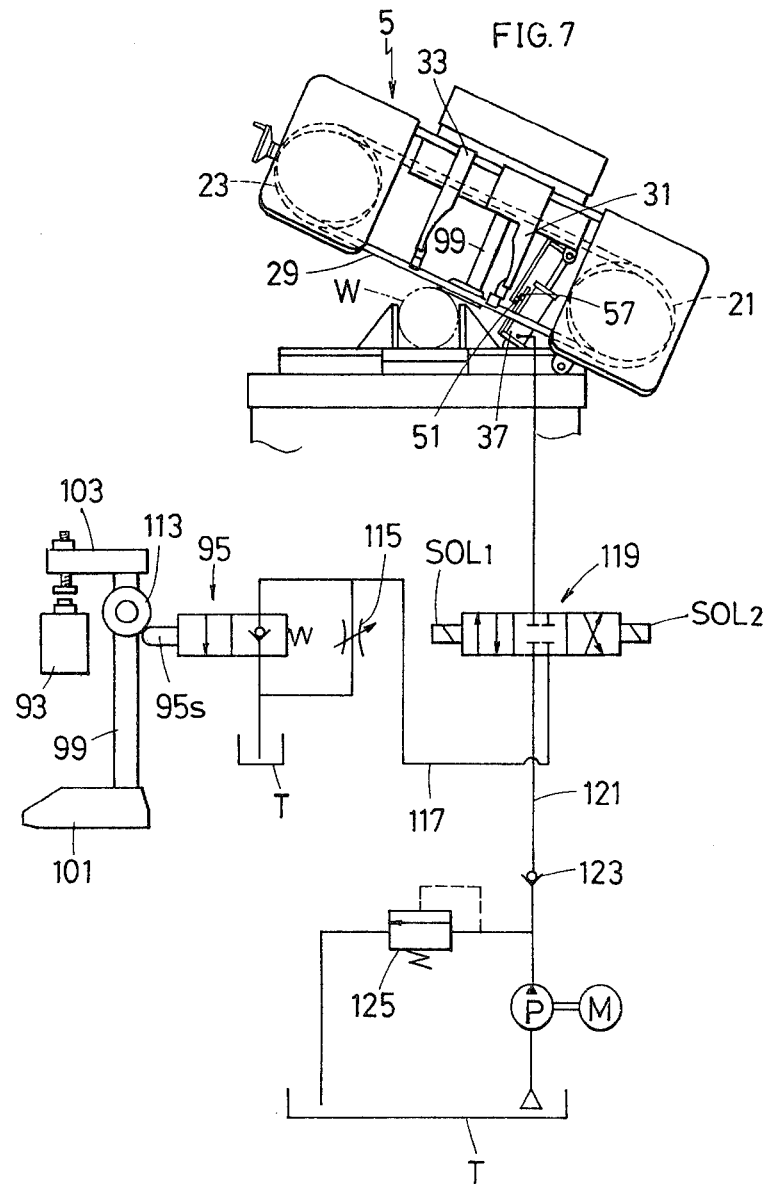
FIG. 7 is a diagrammatic illustration showing the horizontal bandsaw machine shown in FIG. 1 and its hydraulic circuit.

Referring to FIG. 7, the valve means 95 is hydraulically connected in parallel with a flow control valve means 115 by a passage 117 to a solenoid operated valve assembly 119 which is provided in a passage 121 connecting the hydraulic motor 37 to a pump P having a motor M and connected to a tank T in the preferred embodiment. The solenoid operated valve assembly 119 is of a type having four ports and three positions and provided with a pair of solenoids $SOL_1$ and $SOL_2$ in the preferred embodiment. The solenoid operated valve assembly 119 is so arranged as to enable the hydraulic fluid to be supplied into the hydraulic motor 37 from the pump P when the solenoid $SOL_1$ is energized and allow the hydraulic fluid to be drained from the hydraulic motor 37 to the passage 117 when the solenoid $SOL_2$ is energized. Thus, the cutting head assembly 5 is raised by the hydraulic motor 37 when the solenoid $SOL_1$ of the solenoid operated valve assembly 119 is energized, and it is lowered when the solenoid $SOL_2$ is energized. Also, the valve means 95 is so arranged as to enable the hydraulic fluid drained to the passage 117 from the solenoid operated valve assembly 119 to be drained therethrough when the spool 95s is pushed by the roller member 113. In this connection, the hydraulic fluid drained by the solenoid operated valve assembly 119 to the passage 117 from the hydraulic motor 37 can also be drained through the flow control valve means 115 whether or not it is drained through the valve means 95. However, it will be understood that a large amount of the hydraulic fluid can be drained from the hydraulic motor 37 to enable the cutting head assembly 5 to lower at a faster rate when the spool 95s of the valve means 95 is pushed by the roller member 113. Also, there is provided a check valve means 123 between the solenoid operated valve assembly 119 and the pump P, and also a relief valve means 125 is provided between the check valve means 123 and the pump P.

In the above described arrangement, the cutting head assembly 5 is raised by the hydraulic motor 37 to bring up the bandsaw blade 29 when the solenoid $SOL_1$ of the solenoid operated valve assembly 119 is energized to enable the hydraulic fluid to be supplied to the hydraulic motor 37 from the pump P. Also, the cutting head assembly 5 is lowered together with the bandsaw blade 29 when the solenoid $SOL_2$ of the solenoid operated valve assembly 119 is energized to allow the hydraulic fluid to drain from the hydraulic motor 37 to the passage 117. The hydraulic fluid drained to the passage 117 from the hydraulic motor 37 can be always drained through the flow control valve means 115 to the tank T to enable the cutting head assembly 5 to lower. However, when the spool 95s of the valve means 95 is kept pushed by the roller member 113 or the controlling member 103, the hydraulic fluid drained to the passage 117 from the solenoid operated valve assembly 119 can be drained through the valve means 95 as well as the flow control valve means 115 so as to lower the cutting head assembly 5 at a faster rate. Thus, it will be now understood that the bandsaw blade 29 is lowered at a faster rate by the cutting head assembly 5 before cutting into the workpiece W when the valve means 95 is pushed by the controlling member 103 so that the idling of the bandsaw blade 29 may be minimized.

Although a preferred form of the present invention has been illustrated and described, it should be understood that the device is capable of modification by one skilled in the art without departing from the principles of the invention. Accordingly, the scope of the invention is to be limited only by the claim appended hereto.

I claim:

1. An apparatus for controlling the raising and lowering of a cutting head assembly of a horizontal bandsaw machine having a cutting head assembly carrying a bandsaw blade with a cutting edge, said apparatus comprising:
   (a) sensing means for sensing the top surface of a workpiece to be cut;
   (b) actuating means, operatively coupled to said sensing means, said actuating means switching from a first state to a second state when said sensing means senses the top surface of a workpiece;
   (c) carrier means, operatively coupled to said actuating means, wherein the position of said carrier means is moveable with respect to the cutting edge of the blade of the bandsaw when the actuating means is in the first state and the position of said carrier means is fixed with respect to the cutting edge of the blade of the bandsaw when the actuating means is in the second state, wherein the fixed position of said carrier means is adjusted in relation to the top surface of the workpiece when said actuating means is in said first state; and
   (d) detecting means, mounted on said cutting head assembly for movement therewith such that said detecting means contacts said carrier means upon the raising of said cutting head, wherein upon contact of said detecting means and said carrier means, said detecting means provides a signal for stopping the further raising of said cutting head;
   wherein said carrier means comprises:
   (i) an elongated rod member fixed mounted on said cutting head assembly;
   (ii) a dog carrier moveably mounted on said elongated rod member, wherein said dog carrier includes a clamping means coupled to actuating means for contacting and fixedly clamping said dog carrier to said elongated guide rod when said actuating means is in the second state; and
   (iii) dog means mounted on said dog carrier, wherein said detecting means contacts said dog means upon the raising of said cutting head.

2. An apparatus as set forth in claim 1, wherein said actuating means includes a lever means coupled to said clamping means, for moving said clamping means out of contact with said elongated rod member when said actuating means is in the first state.

3. An apparatus as set forth in claim 2, wherein said clamping means includes spring means for normally biasing said clamping means into contact with said elongated rod member.

4. An apparatus as set forth in claim 2, wherein said cutting head assembly includes hydraulic means for raising and lowering said cutting head assembly and wherein said actuating means includes valve means operatively coupled to said hydraulic means, said valve means being actuated by said sensing means such that when said sensing means does not sense the top surface of a workpiece, said valve means is open to thereby enhance the flow of hydraulic fluid from said hydraulic means, when said cutting head assembly is being lowered, whereby the speed of lowering is increased, and when said sensing means senses the top surface of the workpiece, said valve means is closed to thereby reduce flow of hydraulic fluid from said hydraulic means when said cutting head assembly is being lowered, whereby the speed of lowering is reduced.

5. An apparatus as set forth in claim 1, wherein said cutting head assembly includes hydraulic means for raising and lowering said cutting head assembly and wherein said actuating means includes valve means operatively coupled to said hydraulic means, said valve means being actuated by said sensing means such that when said sensing means does not sense the top surface of a workpiece, said valve means is open to thereby enhance the flow of hydraulic fluid from said hydraulic means, when said cutting head assembly is being lowered, whereby the speed of lowering is increased, and when said sensing means senses the top surface of the workpiece, said valve means is closed to thereby reduce flow of hydraulic fluid from said hydraulic means when said cutting head assembly is being lowered, whereby the speed of lowering is reduced.

* * * * *